(12) United States Patent
Signoles

(10) Patent No.: US 10,485,316 B2
(45) Date of Patent: Nov. 26, 2019

(54) CLOSING CLIP FOR BAG WITH REINFORCING STRIPS

(71) Applicant: GOYARD ST-HONORE, Paris (FR)

(72) Inventor: Jean-Michel Signoles, Paris (FR)

(73) Assignee: GOYARD ST-HONORE, Paris (FR)

( * ) Notice: Subject to any disclaimer, the term of this patent is extended or adjusted under 35 U.S.C. 154(b) by 0 days.

(21) Appl. No.: 15/729,315

(22) Filed: Oct. 10, 2017

(65) Prior Publication Data

US 2018/0098611 A1 Apr. 12, 2018

(30) Foreign Application Priority Data

Oct. 11, 2016 (FR) ..................................... 16 59832

(51) Int. Cl.
| | |
|---|---|
| A45C 13/36 | (2006.01) |
| A45C 13/10 | (2006.01) |
| A45C 3/06 | (2006.01) |
| F16B 2/24 | (2006.01) |
| A45C 3/00 | (2006.01) |

(52) U.S. Cl.
CPC ............ *A45C 13/1053* (2013.01); *A45C 3/06* (2013.01); *A45C 13/36* (2013.01); *F16B 2/245* (2013.01); *A45C 3/001* (2013.01)

(58) Field of Classification Search
CPC ...... A45C 13/1053; A45C 13/36; A45C 5/001
USPC .............................. 150/118; 24/581.1; 383/81
See application file for complete search history.

(56) References Cited

U.S. PATENT DOCUMENTS

| | | | | |
|---|---|---|---|---|
| 1,482,728 A | * | 2/1924 | Bracco | ................... A45C 13/06 |
| | | | | 150/118 |
| 2,172,302 A | | 9/1939 | Tinnerman | |
| 2,278,271 A | * | 3/1942 | Laitman | ................... A24F 23/02 |
| | | | | 150/118 |
| 3,286,751 A | | 11/1966 | Dishart | |
| 3,460,282 A | * | 8/1969 | Swirsky | ................... B42D 1/08 |
| | | | | 160/231.2 |
| 4,989,656 A | * | 2/1991 | Derfler | ..................... A45C 3/00 |
| | | | | 150/108 |
| 6,327,749 B1 | * | 12/2001 | Antinone | |

(Continued)

FOREIGN PATENT DOCUMENTS

| | | |
|---|---|---|
| CN | 2587218 Y | 11/2003 |
| FR | 1180353 A | 6/1959 |

(Continued)

OTHER PUBLICATIONS

Search report for French Application No. 16 59832, dated Jan. 31, 2017.

*Primary Examiner* — Sue A Weaver

(74) *Attorney, Agent, or Firm* — Arrigo, Lee, Guttman & Mouta-Bellum LLP

(57) ABSTRACT

The invention relates to a closing clip for a bag with reinforcing strips, comprising a base and two wings extending from the base approximately perpendicular to and on the same side of the base, the wings being separated from each other, each of the wings having an outer face and an inner face, the inner faces facing each other, the closing clip also comprising two locking wedges, each on the inner face of one of the wings at their free ends.

This invention also discloses a bag with reinforcing strips comprising an upper opening, a reinforcing strip fixed on the outer edge of the upper opening and a closing clip according to the invention.

16 Claims, 2 Drawing Sheets

(56) References Cited

U.S. PATENT DOCUMENTS

| | | | | |
|---|---|---|---|---|
| 8,701,319 B2 * | 4/2014 | Boyer | ............ | G09F 7/16 |
| | | | | 40/552 |
| 2003/0016887 A1 * | 1/2003 | Su | ............ | B65D 33/1675 |
| | | | | 383/81 |
| 2005/0060850 A1 | 3/2005 | Auriemma | | |
| 2005/0060923 A1 * | 3/2005 | Ardern, II | ............ | G09F 7/02 |
| | | | | 40/658 |
| 2014/0028009 A1 * | 1/2014 | Kwarta | ............ | B42C 7/00 |
| | | | | 281/29 |
| 2015/0342313 A1 * | 12/2015 | Antinone | ............ | B42F 1/08 |
| | | | | 342/357.51 |

FOREIGN PATENT DOCUMENTS

| | | |
|---|---|---|
| JP | 2000060626 A | 2/2000 |
| JP | 2008220900 A | 9/2008 |

* cited by examiner

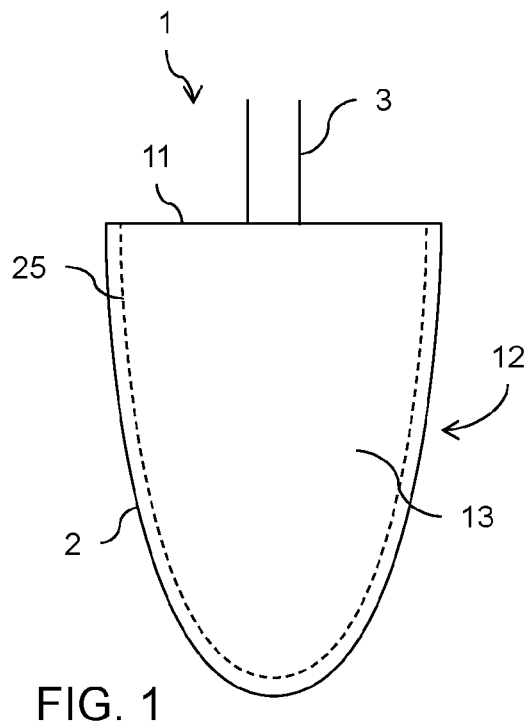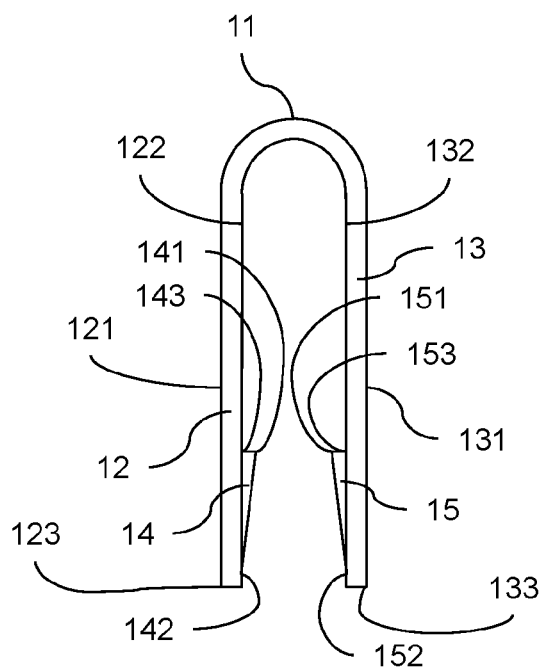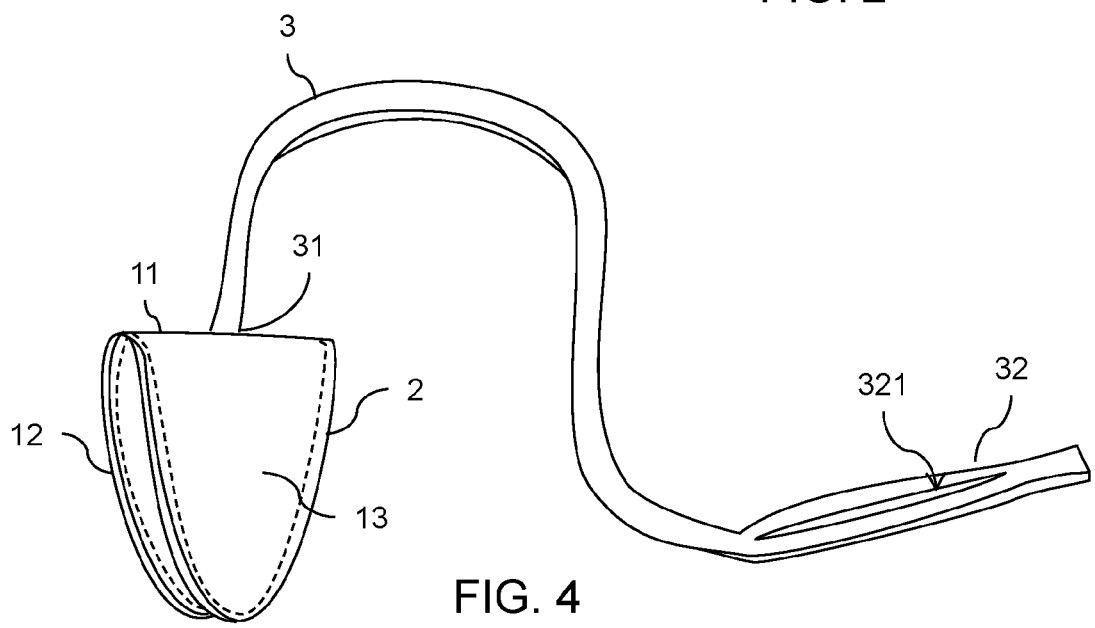

CLOSING CLIP FOR BAG WITH REINFORCING STRIPS

TECHNICAL FIELD OF THE INVENTION

This invention relates to the technical field of bags, and particularly handbags. More particularly, this invention relates to the technical field of bag closing systems, particularly for handbags.

PRIOR ART

A bag, and particularly a handbag, usually contains a pouch with an upper opening and possibly an opening capable of preventing the contents of the bag from spilling when the bag is accidentally turned upside down or protecting these contents from the keen interest of a ill-intentioned third party. At the present time, there is a variety of closing systems for bags and particularly for handbags, such as:
- tie systems;
- button systems (press studs or magnetised);
- zip fastener systems;
- snap hook systems;
- clip systems (with lateral or frontal release);
- locking systems; and
- ball systems.

Tie systems, being more rudimentary than others, has the drawback to require the upper closing edge to be pleated, which does not enable the opening to have two flat edges which are parallel to each other.

Zip fastening systems, frequently called zip systems, comprise two parts fitted with teeth and a central slider. The teeth of one of the parts are shifted in relation to the teeth of the other part and the central slider, which has two grooves that become coincident, either engages or separates the teeth. However, these teeth can sometimes deform or break, making the system unusable.

Snap hook systems, clip systems and locking systems usually comprise two complementary parts that cooperate to lock the upper opening of the bag. Thus, the two parts have to be aligned every time that it is required to close the bag.

Ball systems also have two metal parts (balls) that are usually symmetric with each other, coupled with a spring element, usually an articulated part with two symmetric portions, each of the portions carrying a metal part. This type of ball system is usually difficult to lock and unlock because it requires greater strength.

Presentation of the Invention

Thus, one of the objectives of this invention is to provide a closing system for a bag with reinforcing strips (in French sac à rehausse) to close the bag.

This objective is achieved by means of a closing clip for a bag with reinforcing strips, comprising a base and two wings extending from the base substantially perpendicular to and on the same side of the base, the wings being separated from each other, each of the wings having an outer face and an inner face, the inner faces facing each other, the closing clip also comprising two locking wedges, each on the inner face of one of the wings at their free ends.

Other optional and non-limiting features of the closing clip are presented below.

The base, the two wings and the locking wedges may all form a single part. In this case, the single part may comprise a first layer of a first material which is flexible, a second layer of a second material which is relatively rigid and deformable, and a third layer made of a third material which is rigid, the first, second and third layers being superposed on each other with the second layer sandwiched between the first and the third layers. Furthermore, the first and third layers independently have a thickness of between 0.7 mm and 1.3.mm. Furthermore, the first and the third layers are preferably made of leather.

The thickness of the second layer may be between 0.8 mm and 1 mm. In this case, the second material is preferably made of metal, for example bendable aluminium.

The single part may have an axis of symmetry, and preferably two axes of symmetry, still preferably an oval shape, for example an oval with two axes of symmetry for example such as an ellipse or an oblong shape.

The first and the third layers may be sewn to each other, the stitches enclosing the second layer.

The closing clip may also comprise a strap.

This invention also provides a closing system comprising the closing clip described above and a reinforcing strip (in French rehausse), in other words a piece of reinforced flexible material to be placed at the opening of a bag, particularly on the outer edge of this opening.

Finally, this invention provides a bag with reinforcing strips comprising an upper opening, a reinforcing strip fixed on the outer edge of the upper opening and a closing clip as described above.

The height of the locking wedges can be approximately equal to or less than the thickness of the reinforcing strip.

The distance between the base and the locking wedges can be approximately equal to or slightly greater than the width of the reinforcing strip.

The reinforcing strip is preferably made of a flexible material such as leather.

DRAWINGS

Other objectives, features and advantages will become apparent after reading the description given below as an example and presented with reference to the following illustrative and non-limiting drawings, among which:

FIG. 1 is a diagrammatic front view of a closing clip according to the invention;

FIG. 2 is a diagrammatic side view of the closing clip of FIG. 1;

FIG. 4 is an oblique view of the closing clip of FIG. 1 with a strap.

DETAILED DESCRIPTION

Figure 3:
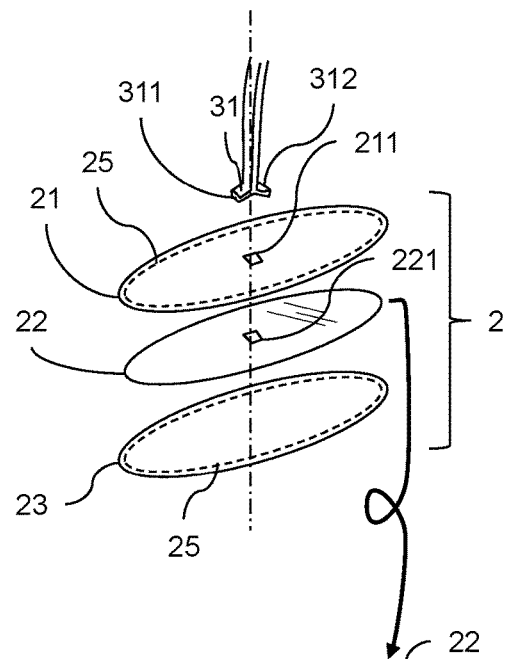
FIG. 3 is an exploded diagrammatic view of the closing clip of FIG. 1.

A closing system for a bag with reinforcing strips according to the invention is described below with reference to FIGS. 1 to 4.

The closing clip 1 comprises a base 11, two wings 12, 13 spaced from each other and two locking wedges 14, 15.

Each of the wings 12, 13 extends from the base 11 on the same side of the base and approximately perpendicular to the base; in other words, the base 11 has a median plane and each of the wings 12, 13 is at an angle equal to between 85 and 95° with the median plane, and preferably 90°. Each of the wings 12, 13 has an outer face 121, 131 and an inner face 122, 132, the inner faces 122, 132 facing each other.

Each of the locking wedges 14, 15 is formed on the inner face 122, 132 of one of the wings 12, 13 at its free end 123, 133, in other words at the part furthest from the base 11. Each of the locking wedges 14, 15 may comprise a proximal side 141, 151 and a distal side 142, 152, relative to the base 11. Advantageously, the proximal side 141, 151 of the locking wedge together with the corresponding inner face 122, 132 forms a retaining shoulder 143, 153. This retaining shoulder 143, 153 enables to lock the closing clip 1 on the reinforcing strip of the bag. Preferably, this retaining shoulder 143, 153 has a height of between 0.9 mm and 1.1 mm, preferably between 0.9 mm and 1.1 mm. The height at the distal side 142, 152 of the locking wedge 14, 15 is advantageously less than the height of the shoulder 143, 153, thus positioning of the closing clip 1 on the reinforcing strip of the bag is facilitated. Preferably, the height at the distal side 142, 152 of the locking wedge 14, 15 is between 0 mm and 0.8 mm, and still preferably 0 mm.

The base 11, the two wings 12, 13 and the two locking wedges 14, 15 preferably form a single part 2, hereinafter called the single part.

The single part 2 may have various forms. The preferred various forms of the single part 2 will be described hereafter considering that the single part 2 has been flattened, in other words the junction between the base 11 and the wings 12, 13 is made virtually equal to 180°. The single part 2 advantageously has a geometric shape with one or possibly two axes of symmetry; the two symmetric parts each representing one wing 12, 13 of the locking clip 1, for example a rectangle, a square, a diamond, an oval. If there are two axes of symmetry, they are preferably perpendicular to each other. The shape of the single part 2 is preferably oval. The term "oval" for the purposes of this presentation includes oblong shapes and ellipses.

The single part 2 preferably comprises a first layer 21 made of a first material which is flexible, a second layer 22 made of a material which is relatively rigid but foldable or deformable and a third layer 23 made of a third material which is flexible, the first, second and third layers 21, 22, 23 being superposed on each other with the second layer 22 sandwiched between the first and the third layers 21, 23, and the first layer 21 forming the outer faces 121, 131 of the closing clip 1 and the third layer 23 forming the inner faces 122, 132 of the closing clip 1. Throughout this disclosure, the term 'relatively rigid" means a material that cannot be easily deformed by hand but that can be deformed with a tool.

The face of the second layer 22 that is facing the third layer 23 comprises two wedging parts 24, 25 arranged to be facing each other. Once these two wedging parts 24, 25 are covered with the third layer 23, they form the locking wedges 14, 15. Thus, their shapes correspond to the shapes of locking wedges 14, 15 as described above.

Advantageously, the first and third materials are leather. Advantageously, the second material is a bendable or deformable material, preferably aluminium.

Advantageously, the first and third layers 21, 23 independently have a thickness of between 0.7 mm and 1.3 mm. Advantageously, the second layer is between 0.8 mm and 1 mm thick.

The first, second and third layers 21, 22, 23 can be assembled in several ways known to the person skilled in the art, but preferably the first and third layers 21, 23 are sewn to each other at their peripheries 25 so as to enclose the second layer 22. Thus, the second layer 22 is smaller than the first and third layers 21, 23. The stitching around their peripheries 25 is preferably made at between 1 mm and 3 mm, and still preferably 2 mm, from the edges of the first and the third layers 21, 23. The lateral edge of the first and third layers 21, 23 is advantageously finished as is normally done in the leather goods industry, for example using wax or gum. In this case, the single part 2 is preferably made flat, and then after stitching is deformed to bring it into its final shape, for example by folding by bending along two lines parallel to each other and dividing the single part 2 into three parts: a central part forming the base 11 and two lateral parts forming the wings 12, 13 of the closing clip 1. In another example, the initially flat single part 2 is bent about its axis of symmetry or about one of its axes of symmetry (in the latter case, preferably about its axis of symmetry corresponding to its largest dimension). The bending radius is preferably between 2 and 10 mm, preferably between 3 and 8 mm, and preferably about 5 mm. In all cases, the second layer made of a relatively rigid material is a reinforcing layer enabling the closing clip 2 to keep its final shape.

The closing clip 1 may also comprise a strap 3 to attach the closing part 1 to an element of the bag with reinforcing strips so that it cannot get lost, for example to one handle provided on the bag. This strap 3 is preferably connected to the base 11, and possibly to the middle of the single part 2. In this case, the "middle" means the centre of gravity of the shape of the single part 2.

The strap 3 may have a first coupling end 31 coupling it to the base 11 and a second coupling end 32 coupling it to an element of the bag with reinforcing strips. Thus, the first coupling end 31 is fixed to the base 11. In order to fix the first coupling end 31 to the base 11, in the case of a single part 2, the first layer 21, and preferably also the second layer 22, present(s) an orifice 211, 221 at the centre with a diameter corresponding to the circumference of the strap 3. The first coupling end 31 is advantageously inserted inside the orifice 211, 221 through a first face of the corresponding layer, and may also comprise two tabs 311, 312 forced into contact with a second face of the corresponding layer opposite the first face. The second coupling end 32 preferably comprises a slit 321 formed along the strap 3 through which an element of the bag with reinforcing strips can be inserted, for example a handle.

The strap 3 is advantageously made of a flexible material, for example leather. The strap 3 may advantageously be a chain, particularly made of metal.

Advantageously, the length of the strap is between 23 cm and 24 cm.

Figure 5:
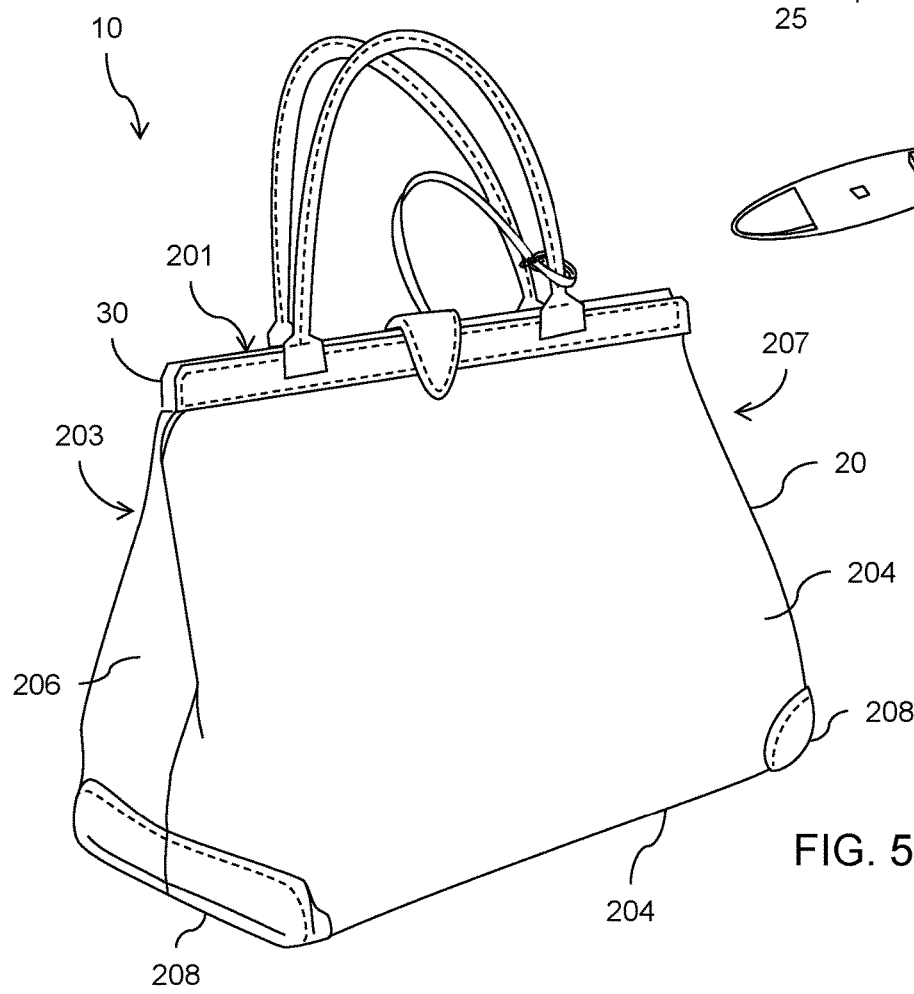
FIG. 5 is a diagrammatic view of a bag with reinforcing strips provided with the closing clip of FIG. 4.

A bag with reinforcing strips according to the invention is described below with reference to FIG. 5. Throughout the remainder of this description, the bag with reinforcing strips will be described as it is normally used. For example, the relative terms "upper" and "lower" refer to this normal position of use and so do the terms "inner" and "outer".

The bag with reinforcing strips 10 comprises a main pouch 20. The main pouch 20 comprises an upper opening 201 that can be closed by two reinforcing strips 30, each located on an outer face of part of the top opening 201 so as to be facing each other. The bag with reinforcing strips 10 also comprises a closing clip 1 as described above.

Advantageously, the added thickness of the facing reinforcing strips and the parts of the edge of the upper opening 201 on which the reinforcing strips are located is approximately equal to the separation distance between the wings 12, 13 of the closing clip 1. The parts of the edge of the upper opening 201 can be slanting, and particularly made of a flexible material such as leather.

The reinforcing strips 30 are preferably made of a flexible material, preferably the same as the material used for the third layer 23 of the single part 2, for example leather. Each of the reinforcing strips 30 is preferably composed of two thicknesses of flexible material, each reinforced by a thickness of a reinforcing material. At its base, the reinforcing strip is preferably positioned astride the corresponding part of the edge of the upper opening.

The height of the locking wedges 14, 15 is advantageously less than or equal to the thickness of the reinforcing strip 30. The distance between the base 21 and the locking wedges 14, 15 (particularly at the shoulder 141, 151) is approximately equal to or is slightly greater than the width of the reinforcing strip 30.

The main pouch 20 may also comprise two main faces 203, 204 facing each other. These two main faces 203, 204 can be sewn to each other at their sides and/or their bottom, their tops forming part of the opening and holding the reinforcing strip 30. Furthermore, the main pouch 20 may comprise one or two lateral gussets 206, 207, notably sewn at the sides of the main faces 203, 204. Furthermore, or alternatively, the main pouch 20 may comprise a base 205 sewn to the bottoms of the main faces 203, 204 and if need be the bottoms of the lateral gussets 206, 207. The main pouch 20 may also comprise reinforcing parts 208 positioned on the lower corners of the main faces 203, 204, if need be the lower corners of the gussets 206, 207, and if need be the corners of the base 205. In other words, the pouch having a general shape, these reinforcing parts are advantageously provided at each vertex at the bottom of the general shape. The bag with reinforcing strips 10 may further comprise one, two or more handles 40. Each of the ends of the handles 40 may be fixed independently of each other to the reinforcing strip 30, on a part of a main face 203, 204 not covered by the reinforcing strip 30, on part of a gusset 206, 207 which is substantially not deformed when the bag is closed, in other words preferably at a distance from the top of the gusset 206, 207. As indicated above, the strap 3 of the closing clip is preferably fixed to one of the handles 40, preferably free to move along the handle 40. For example, the handle 40 passes through the slit 321 in the strap 3. Thus, the slit 321 in the strap 3 is long enough to enable the handle to pass through without difficulty, making it impossible to lose the closing clip. In another example, the slit 321 in the strap 3 is wide enough so that the base and the wings of the closing clip can pass through the slit 321. The loop thus formed by the strap 3 encloses a handle 40. Thus, the closing clip 1 can be removed from the bag, but cannot be lost. Furthermore, fabrication of the closing clip can then be decoupled from fabrication of the bag with reinforcing strips. The slit 321 does not need to be very large, it is sufficient if the width of the slit 321 is very slightly more than the width of the wings and the base, particularly along the minor axis of the oval shape. In this case, all that is necessary to pass the base and the two wings through the slit is to pass firstly one wing, then the base and finally the other wing.

The invention claimed is:

1. A bag with reinforcing strips comprising an upper opening, a reinforcing strip fixed on the outer edge of the upper opening and a closing clip for a bag with reinforcing strips, in which the closing clip comprises a base and two wings extending from the base substantially perpendicular to and on the same side of the base, the wings being separated from each other, each of the wings having an outer face and an inner face, the inner faces facing each other, the closing clip also comprising two locking wedges, each on the inner face of one of the wings at their free ends;
   in which the base, the two wings and the locking wedges are all made in a single part;
   in which the single part comprises a first layer of a first material which is flexible, a second layer of a second material which is relatively rigid and deformable, and a third layer made of a third material which is flexible, the first, second and third layers being superposed on each other with the second layer sandwiched between the first and the third layers;
   in which the first and third layers independently have a thickness of from 0.7 mm to 1.3 mm; and
   in which the first and third materials are leather.

2. The bag with reinforcing strips according to claim 1, in which the second layer has a thickness of from 0.8 mm to 1 mm.

3. The bag with reinforcing strips according to claim 2, in which the second material is made of metal.

4. The bag with reinforcing strips of claim 3, wherein the second material is foldable aluminium.

5. The bag with reinforcing strips according to claim 1, in which the single part has an axis of symmetry.

6. The bag with reinforcing strips according to claim 5, wherein the single part has two axes of symmetry.

7. The bag with reinforcing strips according to claim 5, wherein the single part has an oval shape.

8. The bag with reinforcing strips according to claim 5, wherein the single part has an oval shape has two axes of symmetry.

9. The bag with reinforcing strips according to claim 5, wherein the shape of the single part is an ellipse.

10. The bag with reinforcing strips according to claim 5, wherein the shape of the single part is an oblong.

11. The bag with reinforcing strips according to claim 1, in which the first and third layers are sewn to each other, the stitches enclosing the second layer.

12. The bag with reinforcing strips according to claim 1, in which the closing clip also comprises a strap.

13. The bag with reinforcing strips according to claim 1, in which the locking wedges have a height and the thickness of the reinforcing strip has a thickness, wherein the height of the locking wedges is approximated equal to or slightly less than the thickness of the reinforcing strip.

14. The bag with reinforcing strips according to claim 1, in which the reinforcing strip has a width and the base and locking wedges are arranged such that the distance between the base and the locking wedges is approximately equal to or slightly greater than the width of the reinforcing strip.

15. The bag with reinforcing strips according to claim 1, in which each reinforcing strip is made of leather.

16. A bag with reinforcing strips comprising an upper opening, a reinforcing strip fixed on the outer edge of the upper opening and a closing clip for a bag with reinforcing strips, in which the closing clip comprises a base and two wings extending from the base substantially perpendicular to and on the same side of the base, the wings being separated from each other, each of the wings having an outer face and an inner face, the inner faces facing each other, the closing clip also comprising two locking wedges, each on the inner face of one of the wings at their free ends;
   in which the base, the two wings and the locking wedges are all made in a single part;
   in which the single part comprises a first layer of a first material which is flexible, a second layer of a second material which is relatively rigid and deformable, and a third layer made of a third material which is flexible, the first, second and third layers being superposed on each other with the second layer sandwiched between the first and the third layers; and
   in which the first and third materials are leather.

* * * * *